US008396365B2

(12) United States Patent
Odaka et al.

(10) Patent No.: US 8,396,365 B2
(45) Date of Patent: Mar. 12, 2013

(54) CUSTOMER PREMISES OPTICAL NETWORK UNIT (75) Inventors: Kunio Odaka, Tokyo (JP); Katsuya Aboshi, Tokyo (JP); Kazutaka Simoosako, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 419 days.

(21) Appl. No.: 12/644,630

(22) Filed: Dec. 22, 2009

(65) Prior Publication Data
US 2010/0166429 A1 Jul. 1, 2010

(30) Foreign Application Priority Data
Dec. 26, 2008 (JP) .................................. 2008-332195

(51) Int. Cl.
*H04J 14/00* (2006.01)
(52) U.S. Cl. ................... 398/71; 398/72; 398/70
(58) Field of Classification Search .................. 398/71, 398/72, 70, 66, 67, 68, 58, 33, 34
See application file for complete search history.

(56) References Cited

U.S. PATENT DOCUMENTS

| | | | | |
|---|---|---|---|---|
| 6,839,160 B2 * | 1/2005 | Tsuda et al. | ................... | 359/337 |
| 7,630,637 B2 * | 12/2009 | Mizutani et al. | ................ | 398/67 |
| 7,773,880 B2 * | 8/2010 | Sakamoto et al. | .............. | 398/72 |
| 7,840,137 B2 * | 11/2010 | Kazawa et al. | ................. | 398/72 |
| 2006/0067691 A1 * | 3/2006 | Hirano et al. | ................... | 398/71 |

FOREIGN PATENT DOCUMENTS

| | | |
|---|---|---|
| JP | 09-214541 | 8/1997 |
| JP | 10-290233 | 10/1998 |
| WO | 2007078996 A2 | 7/2007 |
| WO | 2008146517 A1 | 4/2008 |

OTHER PUBLICATIONS

Japanese Office Action, mailing date Oct. 13, 2009, for Japanese Patent Application No. 2008-332195, 3 pages.

* cited by examiner

*Primary Examiner* — M. R. Sedighian
(74) *Attorney, Agent, or Firm* — Turocy & Watson, LLP (57) ABSTRACT There is provided a customer premises optical network unit (ONU) capable of reading management signals and of outputting data through an external node by using $I^2C$ serial interfaces. In the ONU, an ONU functioning section has another serial signal terminal and is connected with a first management processing section through a sub-serial transmission path. The first management processing section is also connected with a MSA interface module through an additional monitoring signal transmission path and a monitoring signal transmission path. The monitoring signal transmission path on the side of the MSA interface module is connected with a sub-I/F section. A part of management signals set in an OAM layer of a signal transmitted between an OLT and the ONU may be outputted to an external node by using the first management processing section, the additional monitoring signal transmission path and the monitoring signal transmission path.

12 Claims, 10 Drawing Sheets

- PRIOR ART -

- PRIOR ART -

CUSTOMER PREMISES OPTICAL NETWORK UNIT

CROSS-REFERENCE TO RELATED APPLICATIONS

The present application claims priority to Japanese Patent Application No. 2008-332195, filed on Dec. 26, 2008, the entirety of which is incorporated in the present application by reference.

BACKGROUND OF THE INVENTION

1. Field of the Invention

The present invention relates to a customer premises optical network termination unit installed in a subscriber's premise in a PON (Passive Optical Network) type optical transmission system.

2. Related Art

The PON-type optical transmission system in which optical transmission paths connected to a center are laid to a plurality of subscriber's premises by splitting the paths by passive-type splitters is employed in optical networks such as FTTH and CATV as described in Japanese Patent Application Laid-open No. Hei.9-214541 as described below. This type of optical transmission system is also called as PDS (Passive Double Star).

Figure 8:
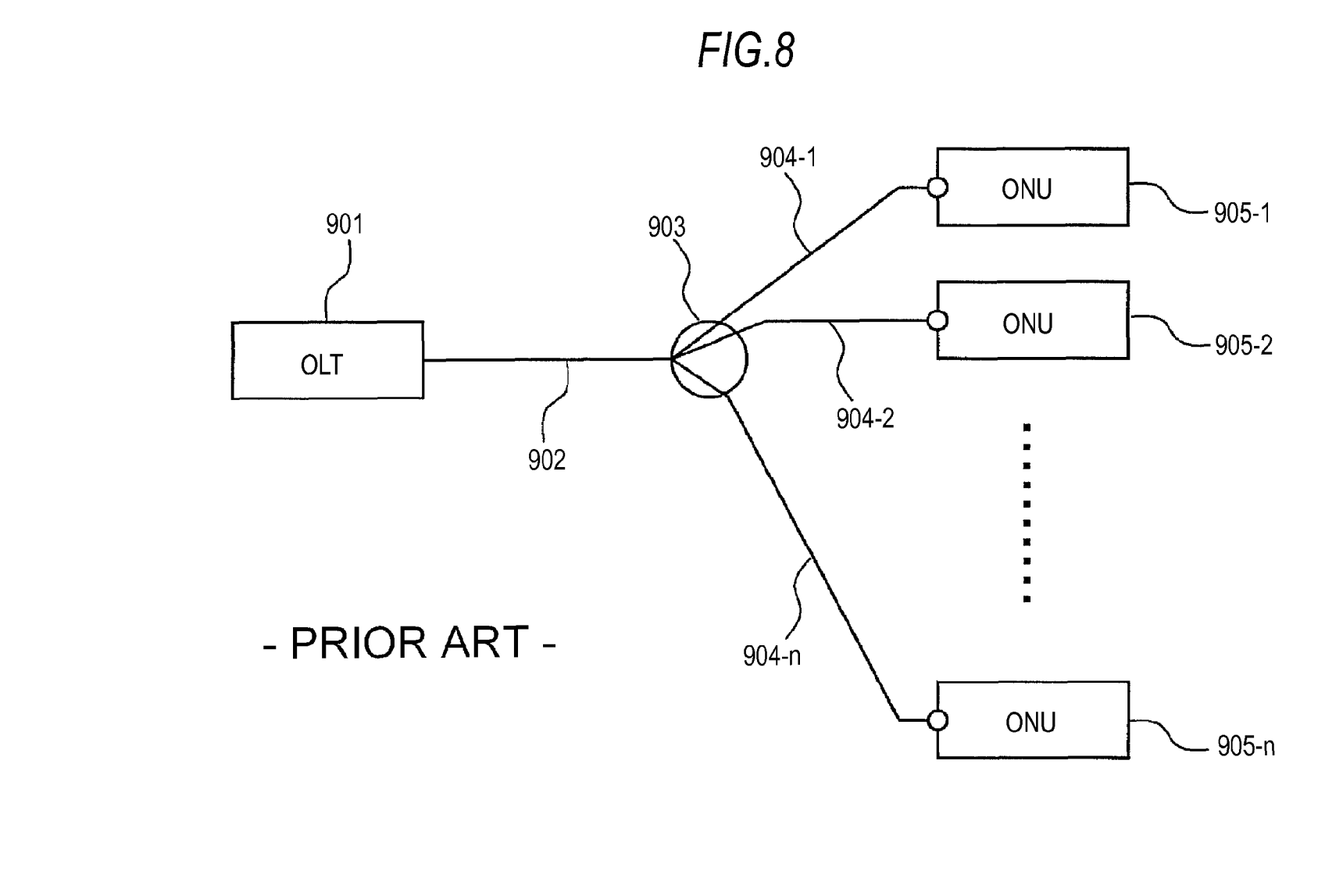
FIG. 8 is a block diagram showing a structure of a prior art optical transmission system.

As shown in FIG. 8, in the PON-type optical transmission system, an optical line terminal (OLT) 901 of the center is connected to a multiplexing terminal of the optical splitter 903 through an optical fiber 902 and optical network units (ONU) 905-1, . . . and 905-n installed in the respective subscriber's premises are connected to a plurality of demultiplexing terminals of the optical splitter 903 through optical fibers 904-1, . . . and 904-n.

Figure 9:
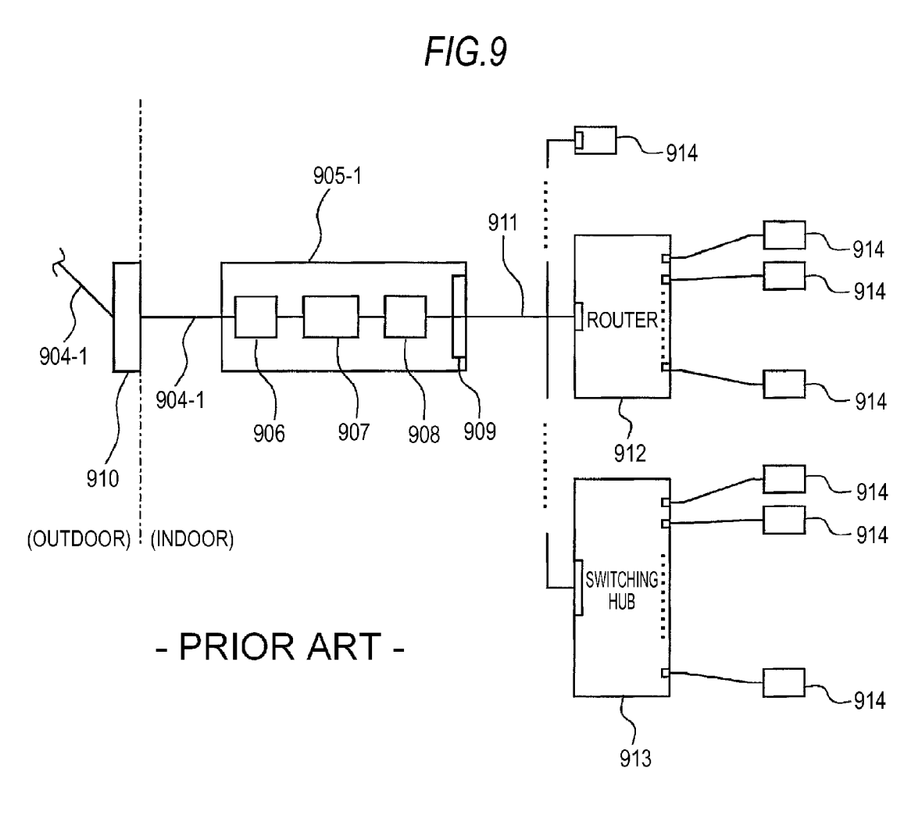
FIG. 9 is a block diagram showing a schematic structure of a customer premises optical network unit of the prior art optical transmission system.

FIG. 9 shows a structure of the ONU 905-1 as one example among the ONUs 905-1, . . . and 905-n. The ONU 905-1 is composed of an optical transceiver section 906, an ONU functioning section 907, a serial/parallel converting section (SERDES) 908 and Ethernet (registered trademark) interface 909. The optical fiber 904-1 connected to the optical splitter 903 is connected to the optical transceiver section 906 via an optical termination unit 910 provided in each subscriber's premise.

10/100/1000 BASE-TXs and the like may be used as the Ethernet interface 909 and a LAN cable 911 for example is connected thereto. Terminal equipments such as computers and printers may be directly connected to the LAN cable 911 or switches such as a router 912 and a switching hub 913 may be connected to the LAN cable 911. Then, different terminal equipments may be connected to those switches. Still more, using a MSA (Multi-Source Agreement) interface module accommodated to specifications of the MSA interface as the interface 909 brings about such considerable merits that those equipments may be directly connected to MSA interface slots provided in an external node and it becomes unnecessary to connect such LAN cable, thus cutting a space for that.

Figure 10:
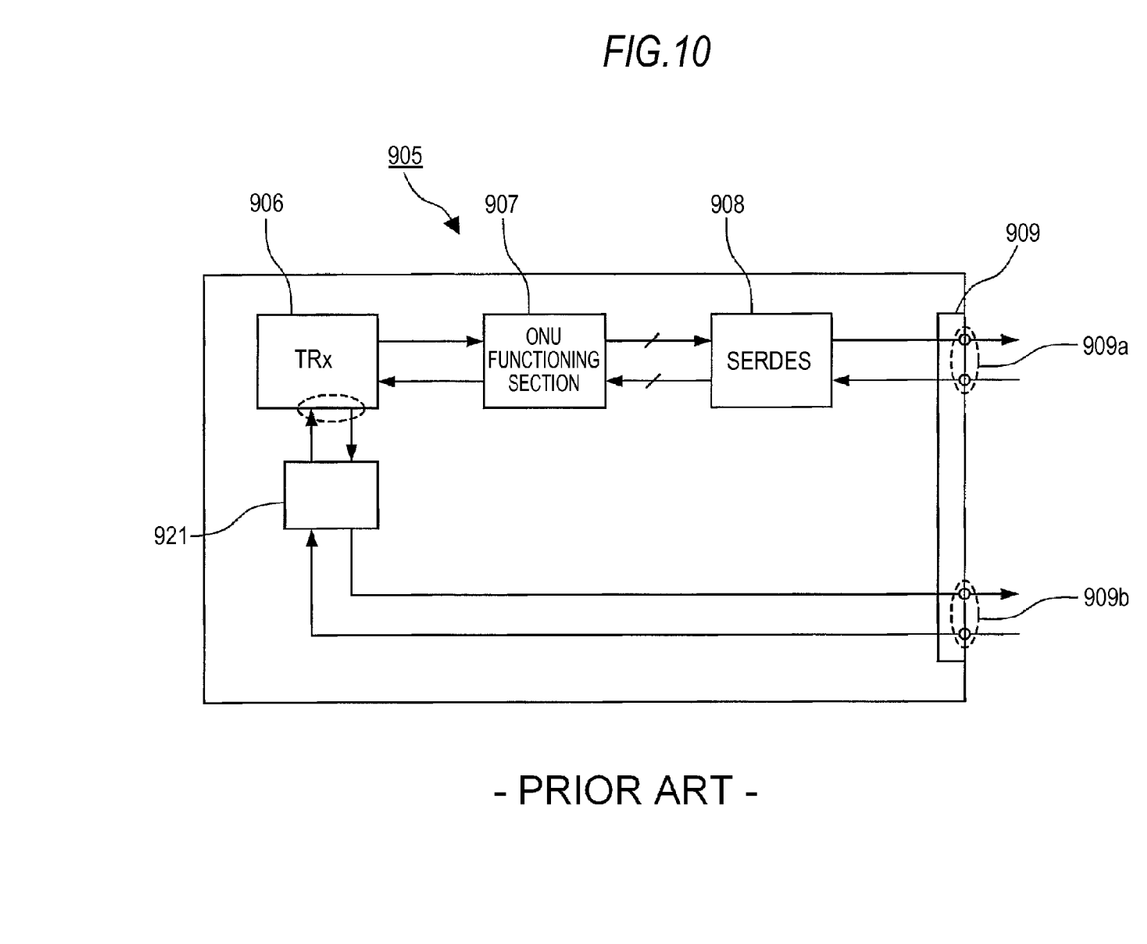
FIG. 10 is a block diagram showing a detailed structure of the prior art customer premises optical network unit.

A structure of the ONU provided with the MSA interface module will be explained in detail below with reference to FIG. 10. FIG. 10 is a block diagram showing one exemplary detailed structure of the ONU 905 (either one of the ONUs 905-1 through 905-n) and has the MSA interface module as the interface 909. The optical transceiver section 906 converts an optical signal into an electrical signal or an electrical signal into an optical signal transmitted between the OLT 901 and the customer premises external node and processes a physical layer (L1) in the OSI (Open System Interconnection) reference model. In order to control and administrate the optical/electrical conversion and electrical/optical conversion processes, the ONU 905 is provided with a management processing section 921.

The management processing section 921 is connected with the optical transceiver section 906, a temperature sensor not shown and others and receives physical data such as optical output of a laser diode (LD) built in the optical transceiver section 906 and temperature of the ONU 905. The MSA interface module 909 is also provided with serial ports 909b accommodating an I²C (Inter Integrated Circuit) and the management processing section 921 is connected with the serial ports 909b by I²C signal lines. Thereby, the external node connected with the MSA interface module 909 can receive the abovementioned physical data through the serial ports 909b.

SUMMARY OF THE INVENTION

Problems to be Solved by the Invention

However, when an abnormality in communication or the like occurs in the PON-type optical transmission system, there is no means to receive information of the ONU such as the abnormality in communication on the external node side in the present state. Information that is receivable from the ONU 905 on the external node side is only the physical data such as the optical output and temperature received from the serial port 909b. It is difficult for the subscriber to know the abnormality of communication state only by such physical data.

There is also a problem that it takes a lot of times for evaluation tests and the like of the ONU also in manufacturing and maintaining the ONU because the ONU is not provided with means for reading out operational information of the ONU. Further, with the advance of downsizing of the ONU, there is a problem how to assure a space for mounting the means for reading out the operational information of the ONU to be used in manufacturing and maintaining the ONU.

Accordingly, the invention aims at solving the abovementioned problems by providing a customer premises optical network unit that permits to read out management signals and to output data from the external node by using the I²C serial interface provided in the MSA interface module.

Means For Solving the Problems

According to a first aspect of the invention, a customer premises optical network unit connected with a center-side optical line termination through optical transmission paths and with an external node through a MSA (Multi-Source Agreement) interface to perform termination processes includes an electrical/optical converting section connected with the center-side optical line termination to perform optical/electrical conversion and electrical/optical conversion of signals, an optical network unit functioning section connected with the electrical/optical converting section to terminate the signals, a serial/parallel converting section connected with the optical network unit functioning section to perform serial/parallel conversion and parallel/serial conversion of the signals, a MSA interface module having a main I/F (interface) section connected with the serial/parallel converting section to input/output the signals to/from the external node and a sub-I/F section for inputting/outputting serial signals, a first management processing section connected with the optical network unit functioning section through a serial signal line or parallel signal line to receive part of the terminated signals and to convert the part of the signals into a serial signal, a monitoring signal transmission path for transmitting the serial signal from the first management processing section to the sub-I/F section, a second management processing section connected with the electrical/optical converting section to receive certain physical data and to output the physical data by converting into a serial signal and another monitoring signal transmission path for connecting the second management processing section with the sub-I/F section;

wherein the monitoring signal transmission path is connected with the sub-I/F section through the other monitoring signal transmission path.

According to a second aspect of the invention, a customer premises optical network unit connected with a center-side optical line termination through optical transmission paths and with an external node through a MSA (Multi-source Agreement) interface to perform termination processes includes an electrical/optical converting section connected with the center-side optical line termination to perform optical/electrical conversion and electrical/optical conversion of signals, an optical network unit functioning section connected with the electrical/optical converting section to terminate the signals, a serial/parallel converting section connected with the optical network unit functioning section to perform serial/parallel conversion and parallel/serial conversion of the signals, a MSA interface module having a main I/F (interface) section connected with the serial/parallel converting section to input/output the signals to/from the external node and a sub-I/F section for inputting/outputting serial signals, a first management processing section connected with the optical network unit functioning section through a serial signal line or parallel signal line to receive part of the terminated signals and to convert the part of the signals into a serial signal and a monitoring signal transmission path for transmitting the serial signal from the first management processing section to the sub-I/F section;

wherein the first management processing section is connected further with the electrical/optical converting section to receive certain physical data and converts the physical data or part of the signals received from the optical network unit functioning section into a serial signal to transmit to the sub-I/F section through the monitoring signal transmission path.

According to another aspect of the invention, the signal includes a management signal based on the PON standard and the first management processing section inputs the management signal as the part of the signal.

According to a still other aspect of the invention, the management signal is a signal for OAM (Operation, Administration and Maintenance) transmitted/received to/from the center-side optical line termination.

According to a different aspect of the invention, the first management processing section selectively outputs the part of the signals corresponding to a predetermined external signal inputted through the sub-I/F section from the external node connected to the MSA interface module.

According to a still different aspect of the invention, the first management processing section receives a predetermined external signal through the sub-I/F section from the external node connected to the MSA interface module and outputs the external signal to the optical network unit functioning section by converting into a serial signal or parallel signal.

According to a further aspect of the invention, functions of the first management processing section is performed by using the same arithmetic unit of the optical network unit functioning section and the management signal transmission path connects the arithmetic unit with the sub-I/F section.

EFFECTS OF THE INVENTION

According to the invention described above, it becomes possible to provide the customer premises optical network unit that permits to read management signals and to output data from the external node by using the serial interface of the $I^2C$. Thereby, the maintainability of the customer premises optical network unit may be remarkably improved.

BEST MODES FOR CARRYING OUT THE INVENTION

A structure of a customer premises optical network unit of best modes of the invention will be explained below in detail with reference to the drawings. It is noted that the respective components having the same functions will be denoted by the same reference numerals to simplify the drawings and explanations thereof.

First Embodiment

Figure 1:
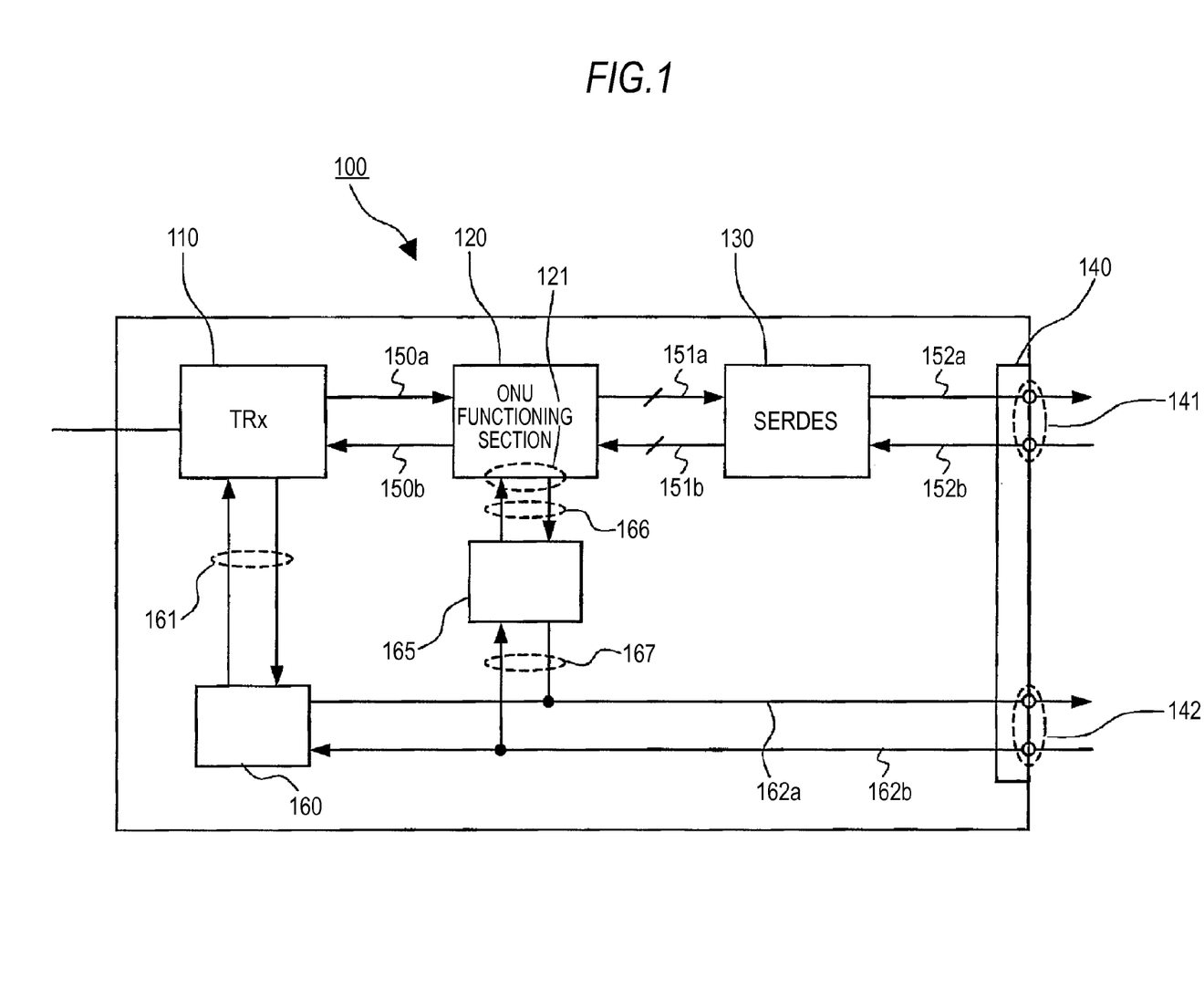
FIG. 1 is a block diagram showing a schematic structure of a customer premises optical network unit according to a first embodiment of the invention.
Figure 2:
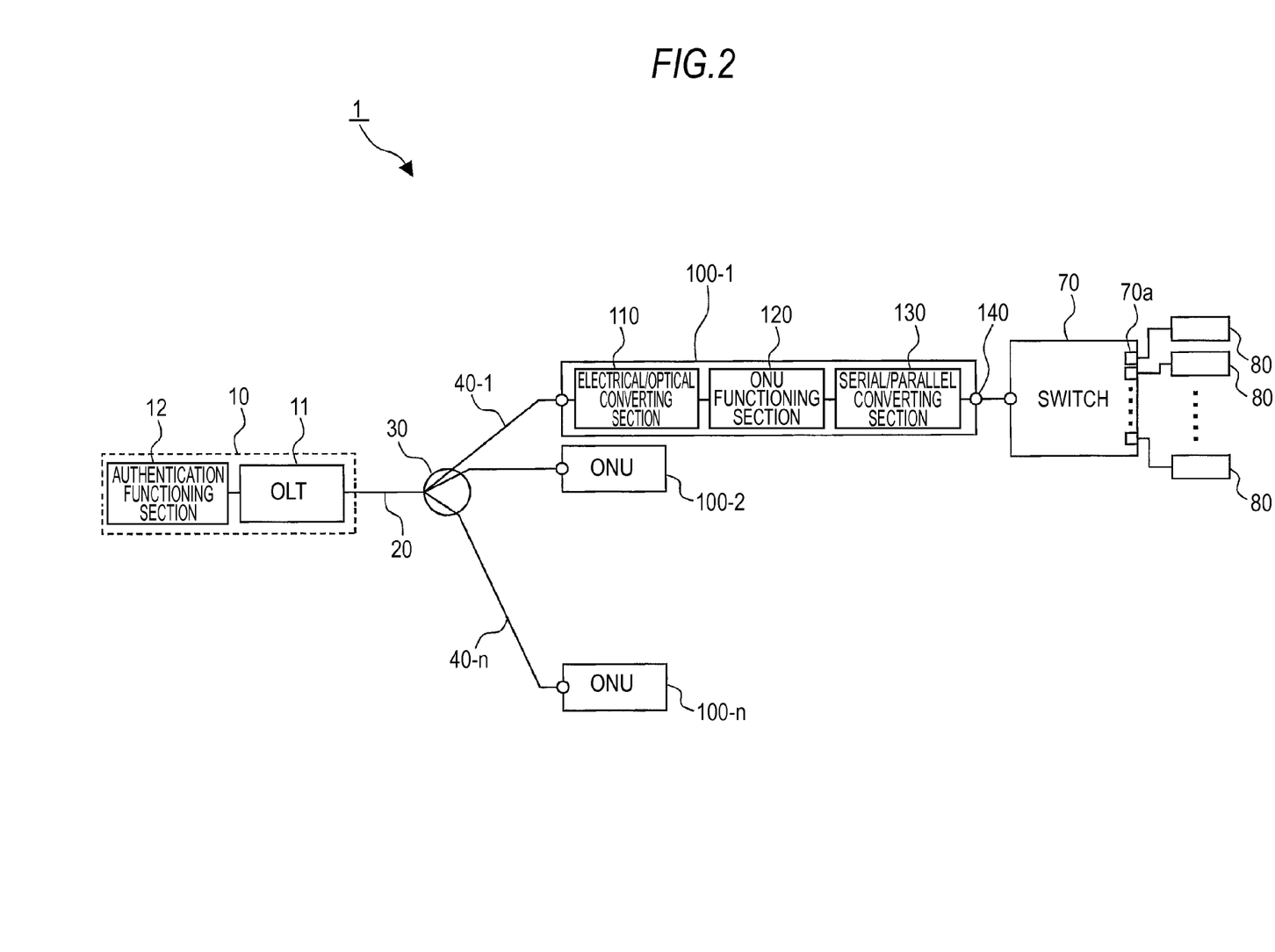
FIG. 2 is a block diagram showing one exemplary structure of a PON-type optical transmission system in which the customer premises optical network unit of the first embodiment is employed.

The customer premises optical network unit (ONU) of a first embodiment of the invention will be explained by using FIG. 1. FIG. 1 is a block diagram showing a schematic structure of the customer premises optical network unit of the first embodiment. FIG. 2 shows one exemplary PON-type optical transmission system constructed by using the ONU 100 of the present embodiment shown in FIG. 1.

In the PON-type optical transmission system 1 shown in FIG. 2, a PON interface card 10 provided in the center has an optical line termination (OLT) 11 and an authentication functioning section 12 and one end of an optical fiber 20, i.e., an optical transmission path, is connected to an optical input/output terminal of the OLT 11. An optical coupler (optical multiplexing/demultiplexing section) 30 has one multiplexing end and two or more demultiplexing ends. The other end of the optical fiber 20 connected to the OLT 11 is connected to the multiplexing end.

Each one end of a plurality of optical fibers 40-1, ... and 40-n (n: natural number, denoted as 40-1 though n hereinafter) is connected with each demultiplexing end of the optical coupler 30. The ONUs 100-1 through n are connected to the other ends of the optical fibers 40-1 through n. By arranging as described above, while a down signal from the OLT 11 is demultiplexed by the optical coupler 30 and is transmitted to each of the ONUs 100-1 through n, an optical signal transmitted from each of the ONUs 100-1 through n is multiplexed by the optical coupler 30 and is transmitted to the OLT 11.

Each of the ONUs 100-1 through n is installed in each subscriber's premise and is connected with an external node 70 such as a personal computer, a switch and a router. The external node 70 is assumed to be a switch in FIG. 2 and a plurality of terminal equipments 80 is connected to a plurality of ports 70a in the switch. The switch used as the external node 70 includes a L2 switch, a L3 switch, a router and the like. The plurality of terminal equipments 80 may be connected to the OLT 11 of the center through the ONU 100 by arranging in this manner.

Equipments conforming to the specifications of GPON (Gigabit Passive Optical Network, a system pursuant to the ITU Standard G984.x) and GEPON (Gigabit Ethernet (registered trademark) PON, a system pursuant to the IEEE 802.3ah Standard) are used for the OLT 11 and the ONUs 100-1 through n.

The ONU 100 of the present embodiment may be used for each ONU composing the PON-type optical transmission system 1 shown in FIG. 2 and each one is denoted as ONU 100 through i (I=1 through n). The ONU 100 of the present embodiment has an electrical/optical converting section (TRx) 110, an optical network unit functioning section (referred to as an ONU functioning section hereinafter) 120, a serial/parallel converting section (SERDES) 130 and a MSA interface module 140 as shown in FIG. 1 as components for processing signals to be transmitted/received to/from the OLT 11. The MSA interface module is used as an interface with the external node 70. The MSA interface module includes such modules as GBIC, SFP and the like.

As signal lines for transmitting signals transmitted/received to/from the OLT 11, the electrical/optical converting section 110 is connected with the ONU functioning section 120 by first serial transmission paths 150a (down signal line) and 150b (up signal line). Further, the ONU functioning section 120 is connected with the serial/parallel converting section 130 by parallel transmission paths 151a (down signal line) and 151b (up signal line) that transmit parallel electrical signals. The parallel signals transmitted through the parallel transmission paths 151a and 151b may be 10 bit signals for example. Further, the serial/parallel converting section 130 is connected with the MSA interface module 140 through second serial transmission paths 152a (down signal line) and 152b (up signal line) that transmit serial electrical signals.

The electrical/optical converting section 110 has an optical output/input terminal for transmitting/receiving optical signals to/from the OLT 11 of the center through the optical fiber 40 and converts an optical signal (down signal) transmitted from the OLT 11 of the center into an electrical signal (optical/electrical conversion). This electrical signal is outputted to the ONU functioning section 120 through the first serial transmission path 150a that is the down signal line. The electrical/optical converting section 110 also converts an electrical signal received from the ONU functioning section 120 through the first serial transmission path 150b that is the up signal line into an optical signal (electrical/optical conversion). This optical signal is transmitted to the OLT 11 through the optical fiber 40.

The ONU functioning section 120 converts the serial signal received from the electrical/optical converting section 110 into a parallel signal and outputs this signal to the serial/parallel converting section 130 through the parallel transmission path 151a, the down signal line, after implementing a predetermined termination process. The ONU functioning section 120 also converts the parallel signal received from the serial/parallel converting section 130 through the parallel transmission path 151b, the up signal line, into a serial signal and outputs this signal to the electrical/optical converting section 110 after implementing a predetermined termination process.

The serial/parallel converting section 130 has serial/parallel conversion and parallel/serial conversion means not shown, converts the parallel signal received from the ONU functioning section 120 into a serial signal by the parallel/serial conversion means and outputs this signal to the MSA interface module 140 through the second serial transmission path 152a, the down signal line. The serial/parallel converting section 130 also converts a serial signal received from the MSA interface module 140 through the second serial transmission path 152b into a parallel signal by the serial/parallel conversion means and outputs the signal to the ONU functioning section 120.

The MSA interface module 140 is directly connected with a MSA interface slot not shown of the external node 70 to transmit serial electrical signals. The MSA interface module 140 has two interface sections of a main interface (I/F) section 141 and a sub-I/F section 142. The second serial transmission paths 152a and 152b connected with the serial/parallel converting section 130 to transmit signals between the external node 70 are connected to the main I/F section 141.

In addition to the components described above, the ONU 100 has a management processing section 160 for outputting data related to operational conditions of the ONU 100 to the external node and serial transmission paths 162 for connecting the management processing section 160 with the MSA interface module 140. The serial transmission paths 162 are composed of I2C signal lines and will be referred to as monitoring signal transmission paths 162 hereinafter. The monitoring signal transmission paths 162 are composed of two signal lines, i.e., a signal line 162a for transmitting serial signals in duplex and a signal line 162b for sending out clock from the external node 70. The monitoring signal transmission paths 162 on the side of the MSA interface module 140 are connected with the sub-I/F section 142. Conventionally, the management processing section 160 is arranged such that it is connected with the electrical/optical converting section 110 by an analog signal line 163 so as to be capable of receiving data of physical layers from the electrical/optical converting section 110 as data related to the operational conditions of the ONU 100 described above and of outputting the data to the outside through the sub-I/F section 142.

In the PON-type optical transmission system, an OAM (Operation, Administration and Maintenance) layer is defined in the signals transmitted between the OLT 11 and the ONU 100 to enhance maintenance and operation functions. The OAM layer corresponds to a data link layer in a second layer in the OSI reference model and is used to transmit a management signal necessary for maintenance, operation and the like. The management signal transmitted in the OAM layer includes information such as a LOS (Loss of Signal) signal indicating communication conditions, a number of packets, a number of errors in a packet, link information and others. The link information also includes an optical level detecting signal SD1 indicating whether or not received light may be physically detected, a signal SD2 indicating whether or not a receiving optical signal includes a logical signal from the OLT 11, a link up signal indicating whether or not a link of a L2 level is established and an authentication signal indicating whether or not authentication of an upper layer is established.

However, the prior art ONU has not been arranged so as to output those management signals to the external node and those management signals have been used for the OLT to operate and manage the ONU. If it becomes possible to receive those management signals also on the external node side, an abnormality or the like of the communication condition of the ONU may be readily detected by the external node. Then, it is conceivable to arrange the prior art ONU 905 shown in FIG. 10 so as to be able to output management signals to the external node by adding a transmitting means from the ONU functioning section 907 that terminates signals to the MSA interface module 909 anew example.

Figure 3:
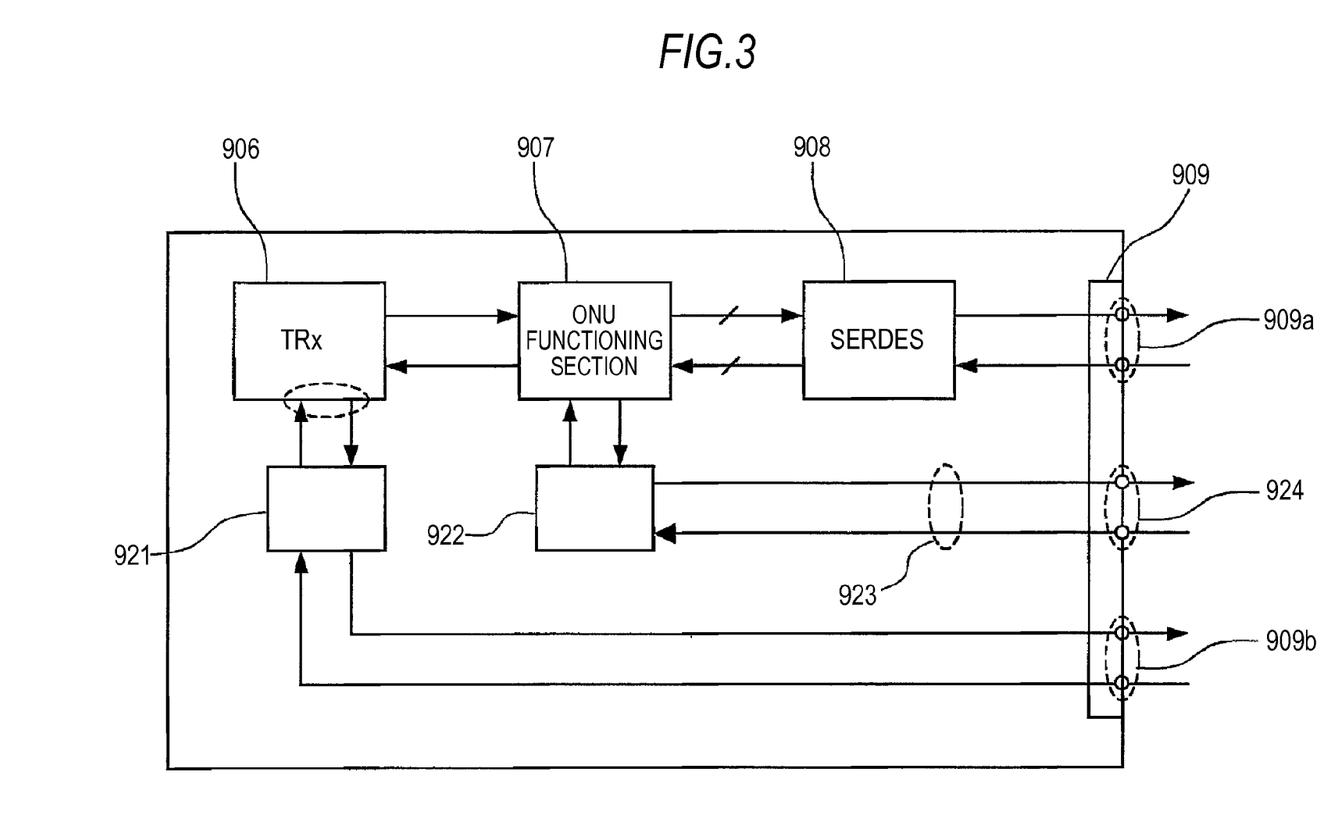
FIG. 3 is a block diagram showing a structure in which a management processing section, a transmission path and a serial port are added in a prior art customer premises optical network unit.

FIG. 3 shows an arrangement of the ONU in which a management processing section 922 for receiving the management signals terminated by the ONU functioning section 907 and outputting them to the external node side, transmission paths 923 and serial ports 924 are added. It becomes possible to provide the management signals to the external node connected with the MSA interface module 909 by receiving the management signals from the ONU functioning section 907 by the management processing section 922 and by outputting the management signals to the serial port 924 through the transmission path 923.

However, when the ONU is arranged as shown in FIG. 3, the MSA interface slot on the external node side is also required to accommodate with the serial port 924. In contrary, a structure of the port is defined under the standard of the MSA interface, so that it is unable to add a serial port 924 anew and to use for outputting the management signals. Even if such port 924 is added, it is unable to input the management signals because the MSA interface slot of the external node cannot accommodate with that.

Then, the ONU 100 of the present embodiment is arranged so that the management signals may be outputted to the external node by using the conventional MSA interface module pursuant to the standard of the MSA interface. That is, as shown in FIG. 1, the present embodiment is arranged so as to use the sub-I/F section 142 conventionally used for inputting/outputting the physical data of the ONU 100 to output the management signals to the external node. Then, in order to utilize the sub-I/F section 142, a transmitting means is provided anew between the ONU functioning section 120 that terminates signals (including the management signals) transmitted from/to the OLT 11 and the sub-I/F section 142 in the present embodiment.

That is, as the transmitting means between the ONU functioning section 120 and the sub-I/F section 142, another management processing section 165 and other transmission paths 166 and 167 are added in the present embodiment. Then, transmission paths between the other management processing section 165 and the sub-I/F section 142 are formed by connecting the other transmission paths 167 with the monitoring signal transmission paths 162. The other management processing section 165 will be referred to as a first management processing section 165 and the management processing section 160 will be referred to as a second management processing section 160 hereinafter.

Beside the first serial transmission paths 150*a* and 150*b* and the parallel transmission paths 151*a* and 151*b* described above, the ONU functioning section 120 has a serial signal terminal 121. Then, the other transmission paths 166 are provided as transmission paths for connecting the serial signal terminal 121 with the first management processing section 165 to transmit the management signals from the ONU functioning section 120 to the first management processing section 165. A serial transmission path or a parallel transmission path is used as the other transmission path 166 corresponding to the ONU functioning section 120. Hereinafter, the transmission path is arranged to be a serial transmission path and this will be referred to as a sub-serial transmission path 166. Further, the other transmission path 167 will be referred to as an additional monitoring signal transmission path 167.

The management signal transmitted from the ONU functioning section 120 to the first management processing section 165 through the sub-serial transmission path 166 is transmitted further to the sub-I/F section 142 through the additional monitoring signal transmission path 167 and the monitoring signal transmission path 162 and is then outputted to the external node through the sub-I/F section 142. When the physical data such as optical output and temperature is outputted from the second management processing section 160, such data is outputted from the sub-I/F section 142 to the external node in the same manner with the prior art in the present embodiment. When the first management processing section 165 outputs the management signal, it is also outputted from the sub-I/F section 142 to the external node.

By arranging as described above, it becomes possible to receive the information of the management signal from the ONU 100 and to confirm the communication condition of the ONU 100 through the external node. When link information of the management signal received by the external node is SD1=OK and SD2=NG for example, it can be seen that the ONU is in a state in which although an optical level inputted to the ONU 100 reaches a necessary threshold value (−10 dBm for example) or more, the ONU 100 is receiving light having no logical meaning (continuous light for example). When SD1=OK and SD2=OK, it can be seen that the ONU 100 is detecting signals having logical meaning (idling signal and control and management signals for example) outputted from the OLT 11 among optical signals. Still more, when linkup=OK and authentication=NG, it can be seen that although logical link up of L2 is enabled, authentication is not admitted due to such a reason that the subscriber is not paying a registration fee.

Figure 4:
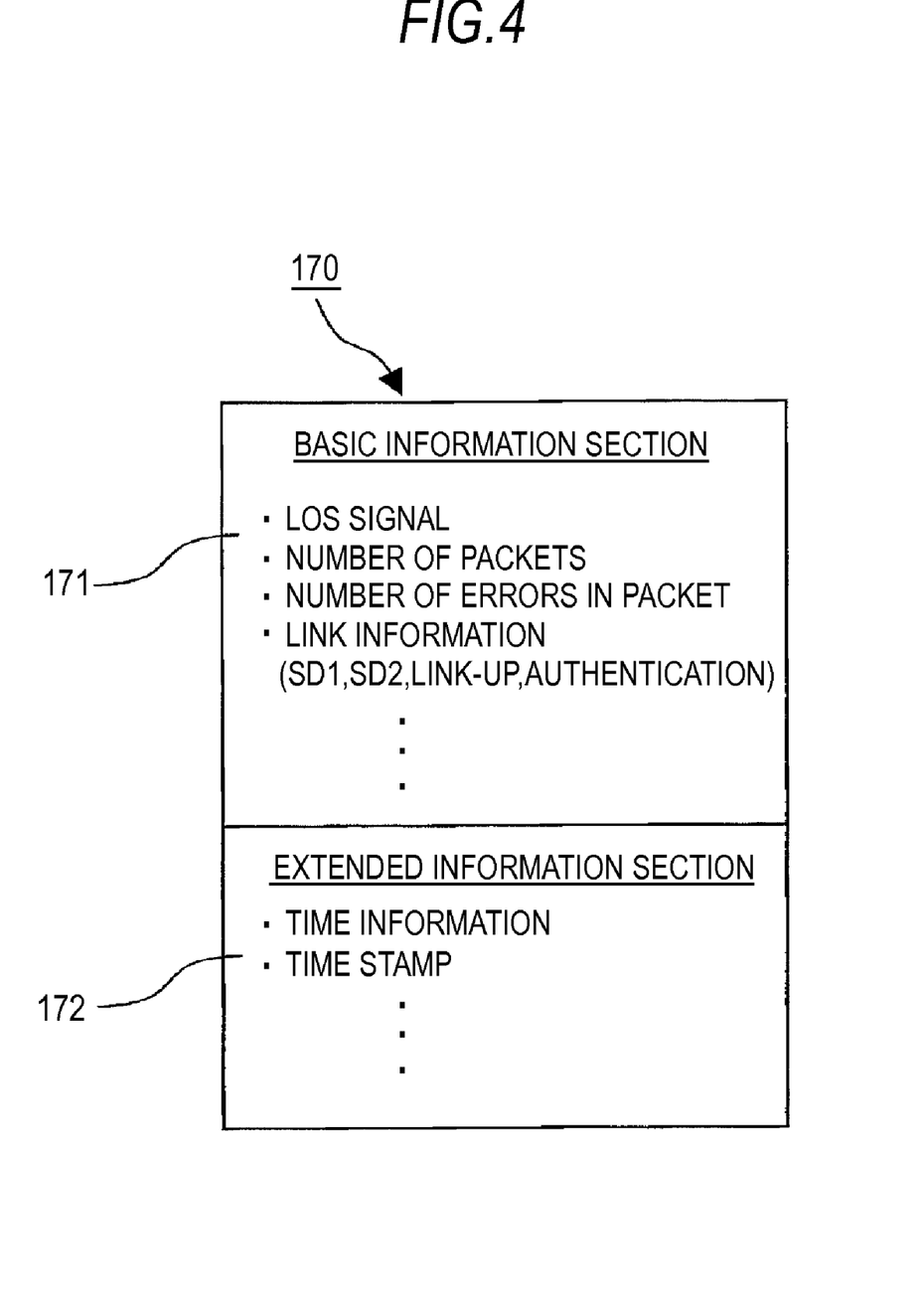
FIG. 4 is a diagram showing one exemplary pattern of an extended OAM layer.

According to the standard of the IEEE 802.3 ah, it is permitted to extend the OAM layer as necessary and the OAM layer may be arranged as shown in FIG. 4. FIG. 4 is a diagram showing one exemplary pattern of the extended OAM layer. The extended OAM layer 170 is composed of a basic information section 171 and an extended information section 172. Basic management signals such as the LOS signal described above are set in the basic information section 171 and appropriately specified data may be set in the extended information section 172. They may be used in transmitting information such as time information, time stamp, distance information between the OLT and ONU and data arrival delay information for example.

Second Embodiment

Figure 5:
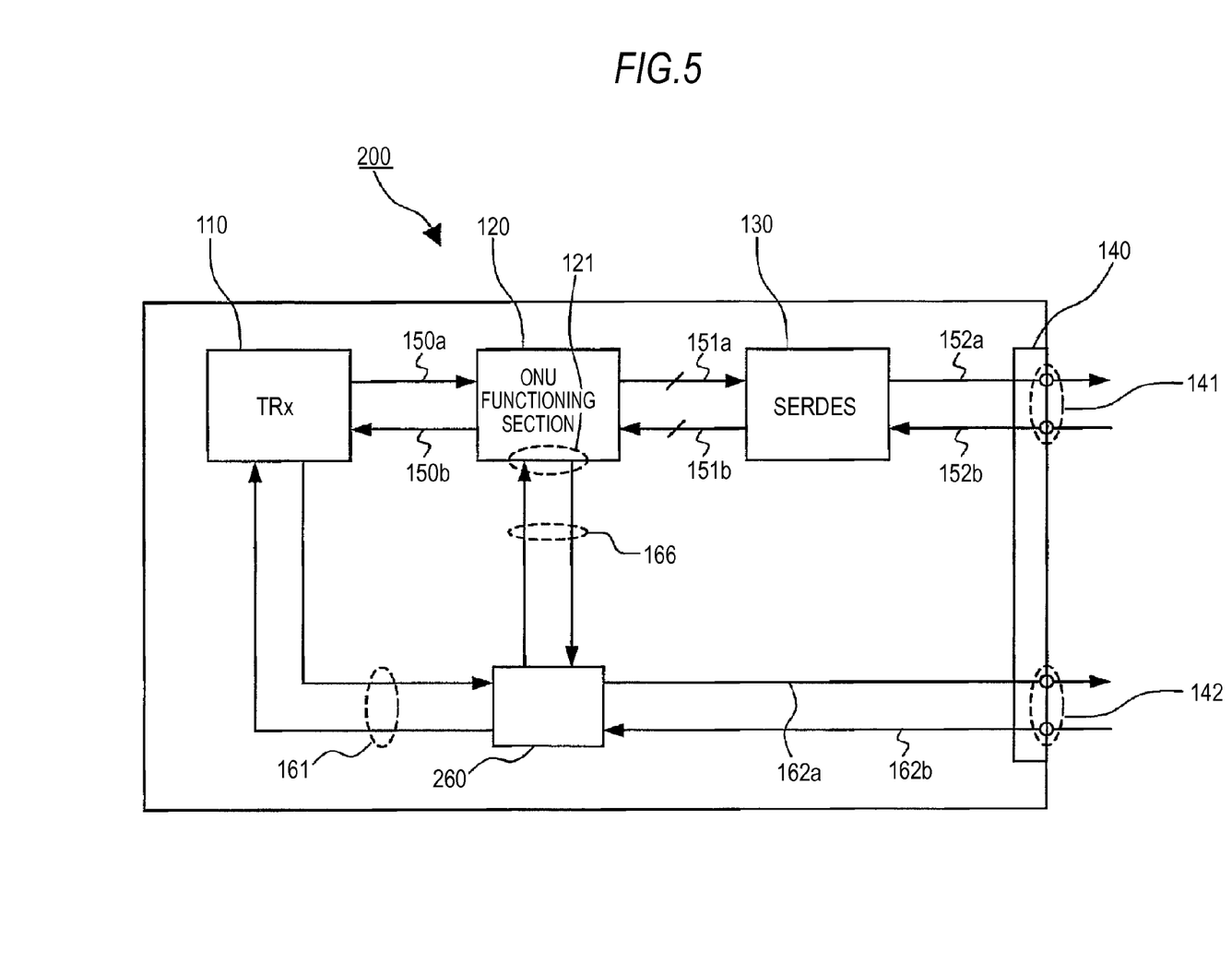
FIG. 5 is a block diagram showing a schematic structure of a customer premises optical network unit according to a second embodiment of the invention.

A second embodiment of the customer premises optical network unit (ONU) of the invention will be explained below with reference to FIG. 5. FIG. 5 is a block diagram showing a schematic structure of the customer premises optical network unit 200 of the second embodiment. In the present embodiment, the function of the first management processing section 165 provided in the ONU 100 of the first embodiment is integrated with the second management processing section 160 as a management processing section 260 to simplify the structure of the ONU 200. The sub-serial transmission path 166 is arranged so as to connect the serial signal terminal 121 with the management processing section 260 by eliminating the first management processing section 165. Further, the additional monitoring signal transmission path 167 becomes unnecessary and is eliminated in the ONU 200.

In the ONU 200 of the present embodiment, the management processing section 260 processes signals of physical data in the same manner with the prior art and also outputs management signals received from the ONU functioning section 120 to the external node as described above. Thereby, it becomes possible to confirm the communication condition by receiving information of the management signals from the ONU 200 through the external node in the same manner with the ONU 100 of the first embodiment. It is also possible to lower the cost of the ONU by simplifying its structure by integrating the management processing sections in the present embodiment.

Figure 6:
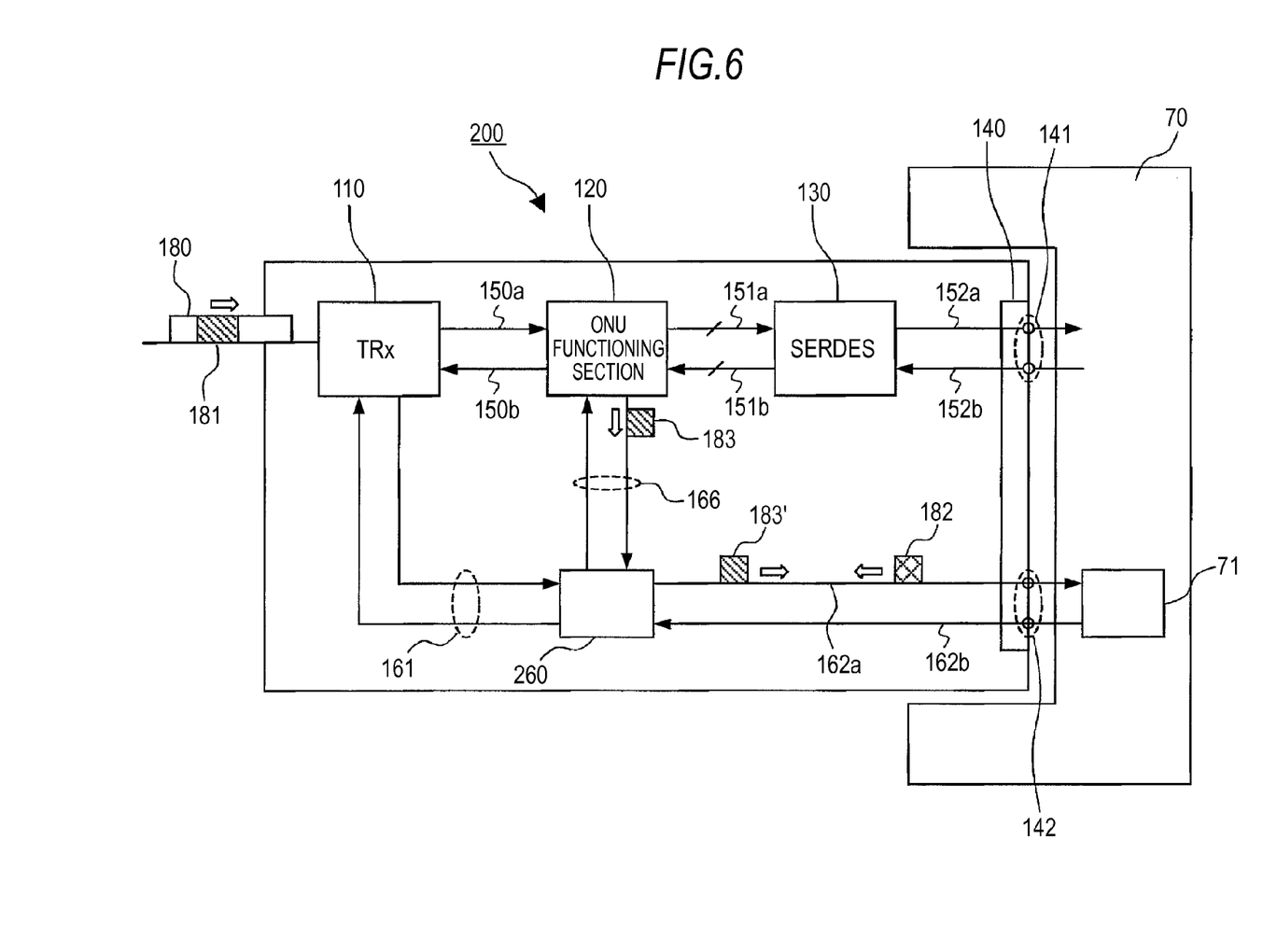
FIG. 6 is a block diagram showing one exemplary data flow when an ONU is connected to an external node to obtain management signals.

The sub-I/F section 142 that is conventionally used to output data corresponding to the physical layer to the external node is arranged to be also used to output the management signals that is information of the data link layer (second layer) in the ONUs 100 and 200 of the first and second embodiments described above. An embodiment in which the external node 70 obtains the management signals from the ONU 100 or 200 through the sub-I/F section 142 will be explained below. While a case of using the ONU 200 of the second embodiment will be explained here, the external node 70 may obtain the management signals from the ONU 100 in the same manner also when the ONU 100 of the first embodiment is used. FIG. 6 is a block diagram showing one exemplary flow of data in obtaining the management signal by connecting the ONU 200 of the second embodiment to the external node 70.

In FIG. 6, the external node 70 has a serial signal input/output section 71 for connecting with the sub-I/F section 142 of the ONU 200. A signal transmitted between the OLT 11 of the center and the ONU 200 is denoted by a numeral 180. A management signal 181 is preset in the OAM layer of the signal 180. This signal is terminated by the ONU functioning section 120 and becomes accessible from the management processing section 260.

Meanwhile, when a request signal 182 requesting the management signal is outputted out of the serial signal input/output section 71b in the external node 70, it is transmitted to the management processing section 260 from the sub-I/F section 142 through the monitoring signal transmission path 162a. When the management processing section 260 receives the request signal 182, it accesses the ONU functioning section 120 through the sub-serial transmission path 166 and obtains part or all of data 183 selected in advance among the management signal 181 from the ONU functioning section 120. Then, the management processing section 260 outputs the part or all of the received management signal 183 to the monitoring signal transmission path 162a to output to the external node 70 through the sub-I/F section 142.

It becomes possible for the external node 70 to receive the predetermined management signal from the ONU 200 through the sub-I/F section 142 by arranging the ONU 200 of the second embodiment as described above. Because the LOS signal, link information and others are contained in the management signal 181 transmitted between the OLT 11 and the ONU 200, it becomes possible to output such information to the external node 70 by using the management processing section 260 and the monitoring signal transmission path 162 by selecting such information in advance and to grasp a status of a communication trouble and the like on the side of the subscriber's premise. As a consequence, it becomes possible to remarkably improve maintainability of the ONU 200.

In addition to the function of reading out the operational information of the ONU 200, it is also possible to put a function of maintaining the ONU 200 by inputting external signals such as a testing signal and preset values as a testing device in manufacturing or maintaining the ONU 200. When the external node 70 is employed as such testing device and a predetermined testing signal is outputted from the serial signal input/output section 71 to the ONU 200 for example, the testing signal is transmitted to the management processing section 260 through the monitoring signal transmission path 162a. The testing signal may be also outputted to the ONU functioning section 120 through the sub-serial transmission path 166. Thereby, it becomes possible to test the ONU 200 in high level and to remarkably improve efficiency of maintenance works and others.

Other Embodiments

As a still other embodiment of the invention, it is also possible to select and read the management signal in the OAM layer of the signal 180 from the external node 70. That is, a request signal requesting data necessary in the management signal is outputted as an external signal from the external node 70 to the ONU 100 or 200 through the sub-I/F section 142. When this request signal is transmitted to the management processing section 160 or 260 through the monitoring signal transmission path 162a, the management processing section 160 or 260 reads out the management signal requested by the request signal out of the ONU functioning section 120 and outputs to the external node 70 through the monitoring signal transmission path 162a. It is possible to remarkably improve the maintainability of the ONU 100 or 200 by thus enabling to selectively request the management signal to the ONU 100 or 200 from the external node 70.

Figure 7:
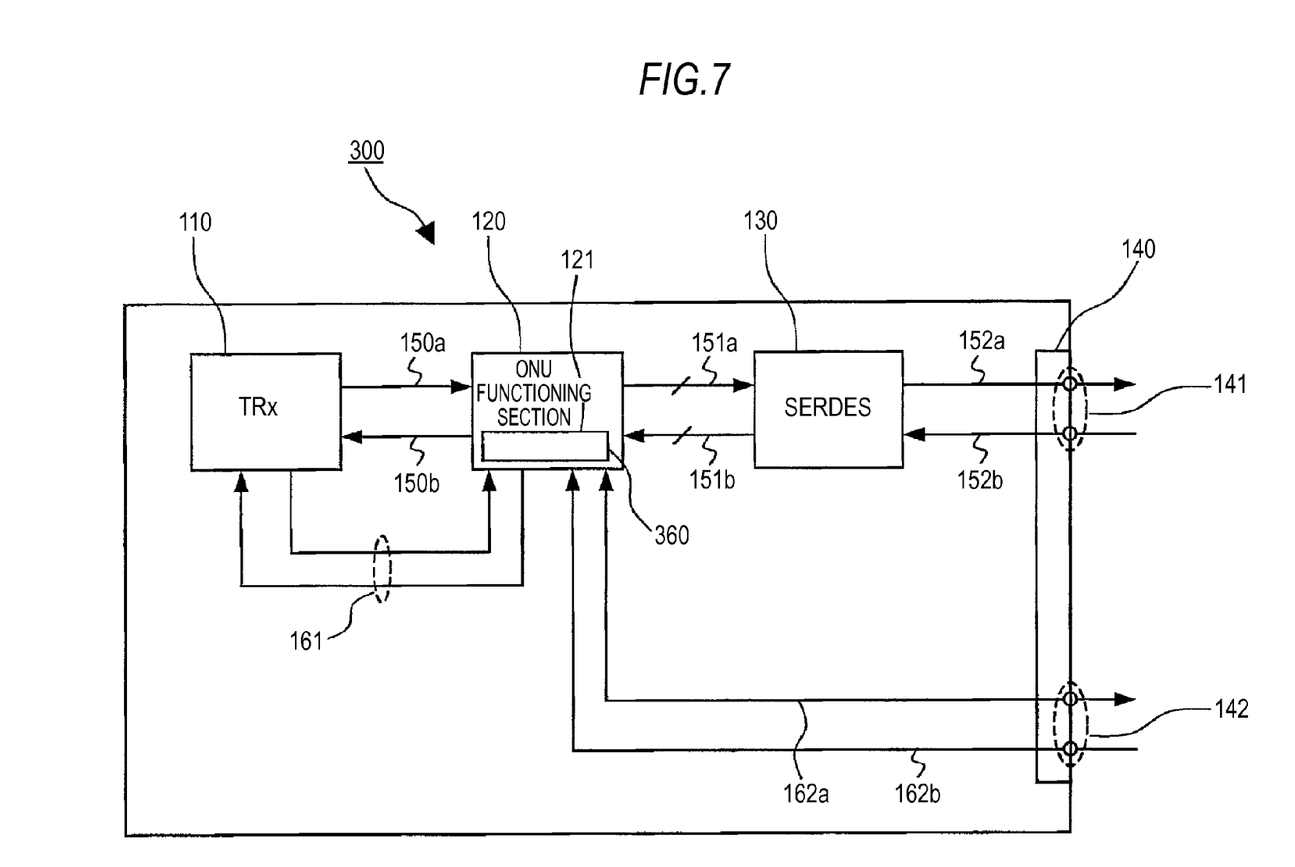
FIG. 7 is a block diagram showing a schematic structure of a customer premises optical network unit according to a still other embodiment of the invention.

A different embodiment of the invention will be explained below with reference to FIG. 7. While the management processing section 160 or 260 is solely provided in the ONU in the embodiments described above, the functions carried out by the management processing section 160 or 260 is executed within the ONU functioning section 120 in an ONU 300 of the present embodiment. That is, a management processing section 360 that performs the same processes with those of the management processing section 160 or 260 is provided in the ONU functioning section 120 by utilizing an arithmetic unit used in the processing of the ONU functioning section 120. Thereby, the hardware structure of the ONU 300 may be simplified.

In order to execute the processes of the management processing section 360 within the ONU functioning section 120, the analog signal line 161 connected with the electrical/optical converting section 110 is directly connected with a predetermined interface of the ONU functioning section 120. The monitoring signal transmission path 162 connected to the sub-I/F section 142 is also directly connected to a predetermined serial interface of the ONU functioning section 120. The ONU 300 capable of receiving a management signal for maintenance and management from the external node and having the simple structure may provided by arranging as described above.

It is noted that the descriptions in the embodiments present mere examples of the customer premises optical network unit of the invention and the invention is not limited to them. The detailed structures and operations of the customer premises optical network unit of the embodiments may be appropriately modified within the range not departing from the spirit of the invention described in the following claims.

DESCRIPTION OF REFERENCE NUMERALS

1,2 optical transmission system
10 PON interface card
11, 901 OLT
12 authentication functioning section
20, 40, 902, 904 Optical fiber
30, 903 optical coupler
50 ONU
70 external node
80, 914 terminal unit
100, 905, 920 customer premises optical network unit
110 electrical/optical converting section
120, 907 ONU functioning section
121 serial signal terminal
130, 908 serial/parallel converting section
140, 909 MSA interface module
141 main I/F section
142 sub-I/F section
150*a*, 150*b* first serial transmission path
151*a*, 151*b* parallel transmission path
152*a*, 152*b* second serial transmission path
160, 165, 260, 360 management processing section
161 analog signal line
162 monitoring signal transmission path
166 sub-serial transmission path
167 additional monitoring signal transmission path
170 extended OAM layer
171 basic information section
172 extended information section
180 signal
181 management signal
182 request signal
183 part of management signal

What is claimed is:

1. A customer premises optical network unit connected with a center-side optical line termination through optical transmission paths and with an external node through a MSA (Multi-source Agreement) interface to perform termination processes, comprising:

an electrical/optical converting section connected with said center-side optical line termination to perform optical/electrical conversion and electrical/optical conversion of signals;

an optical network unit functioning section connected with said electrical/optical converting section to terminate said signals;

a serial/parallel converting section connected with said optical network unit functioning section to perform serial/parallel conversion and parallel/serial conversion of said signals;

a MSA interface module having a main I/F (interface) section connected with said serial/parallel converting section to input/output said signals to/from said external node and a sub-I/F section for inputting/outputting serial signals;

a first management processing section connected with said optical network unit functioning section through a serial signal line or parallel signal line to receive part of said terminated signals and to convert the part of said terminated signals into a first serial signal;

a monitoring signal transmission path for transmitting said first serial signal from said first management processing section to said sub-I/F section;

a second management processing section connected with said electrical/optical converting section to receive predetermined physical data and to output the predetermined physical data by converting into a second serial signal; and another monitoring signal transmission path for connecting said second management processing section with said sub-I/F section;

wherein said monitoring signal transmission path is connected with said sub-I/F section through said other monitoring signal transmission path.

2. A customer premises optical network unit connected with a center-side optical line termination through optical transmission paths and with an external node through a MSA (Multi-source Agreement) interface to perform termination processes, comprising:

an electrical/optical converting section connected with said center-side optical line termination to perform optical/electrical conversion and electrical/optical conversion of signals;

an optical network unit functioning section connected with said electrical/optical converting section to terminate said signals;

a serial/parallel converting section connected with said optical network unit functioning section to perform serial/parallel conversion and parallel/serial conversion of said signals;

a MSA interface module having a main I/F (interface) section connected with said serial/parallel converting section to input/output said signals to/from said external node and a sub-I/F section for inputting/outputting serial signals for management;

a management processing section connected with said electrical/optical converting section to receive predetermined physical data and to output the predetermined physical data by converting into a first serial signal; and a monitoring signal transmission path connected between said management processing section and said sub-I/F section to transmit data for management, said management processing section being connected further with said optical network unit functioning section through a serial signal line or a parallel signal line to receive part of said terminated signals and to convert the part of said terminated signals into a second serial signal, the management processing section transmitting one of said first serial signal converted from said predetermined physical data and said second serial signal converted from the part of said terminated signals to said sub-I/F section through said monitoring signal transmission path.

3. The customer premises optical network unit according to claim 1, wherein said signal includes a management signal based on a passive optical network (PON) standard and said first management processing section inputs said management signal as the part of said terminated signals.

4. The customer premises optical network unit according to claim 3, wherein said management signal is a signal for OAM (Operation, Administration and Maintenance) transmitted/received to/from said center-side optical line termination.

5. The customer premises optical network unit according to claim 1, wherein said first management processing section selectively outputs the part of said terminated signals corresponding to a predetermined external signal inputted through said sub-I/F section from said external node connected to said MSA interface module.

6. The customer premises optical network unit according to claim 1, wherein said first management processing section receives a predetermined external signal through said sub-I/F section from said external node connected to said MSA interface module and outputs said predetermined external signal to said optical network unit functioning section by converting into a third serial signal or a parallel signal.

7. The customer premises optical network unit according to claim 1, wherein functions of said first management processing section are performed by using an arithmetic unit of said optical network unit functioning section and said monitoring signal transmission path connects said arithmetic unit with said sub-I/F section.

8. The customer premises optical network unit according to claim 2, wherein said signal includes a management signal based on a passive optical network (PON) standard and said management processing section inputs said management signal as the part of said terminated signals.

9. The customer premises optical network unit according to claim 8, wherein said management signal is a signal for OAM (Operation, Administration and Maintenance) transmitted/received to/from said center-side optical line termination.

10. The customer premises optical network unit according to claim 2, wherein said management processing section selectively outputs the part of said terminated signals corresponding to a predetermined external signal inputted through said sub-I/F section from said external node connected to said MSA interface module.

11. The customer premises optical network unit according to claim 2, wherein said management processing section receives a predetermined external signal through said sub-I/F section from said external node connected to said MSA interface module and outputs said predetermined external signal to said optical network unit functioning section by converting into a third serial signal or a parallel signal.

12. The customer premises optical network unit according to claim 2, wherein functions of said management processing section are performed by using an arithmetic unit of said optical network unit functioning section and said monitoring signal transmission path connects said arithmetic unit with said sub-I/F section.

* * * * *